Feb. 26, 1957 C. P. LENT 2,782,861
HELICOPTER BLADES AND THRUST AUGMENTERS THEREFOR
Filed June 12, 1952 7 Sheets-Sheet 4

INVENTOR.
Constantin P. Lent.

United States Patent Office 2,782,861
Patented Feb. 26, 1957

2,782,861

HELICOPTER BLADES AND THRUST AUGMENTERS THEREFOR

Constantin Paul Lent, New York, N. Y.

Application June 12, 1952, Serial No. 293,044

4 Claims. (Cl. 170—135.4)

This invention relates to aerial augmenters or boosters to produce a vertical thrust or lift in autogiros and helicopters. More particularly it relates to aerial reaction driven thrust augmenters for developing a booster thrust or momentum and improving the operation of helicopters. Also such boosters may be used to improve the take-off speed of autogiros and helicopters and to improve the latter overall flying efficiency and their maneuverability under enemy fire.

Generally speaking, an autogiro is an aircraft whose forward propulsion is obtained by means of a conventional propeller and having horizontally mounted blades above the fuselage driven only by air forces and intended to sustain the aircraft; and a helicopter is an aircraft which is lifted and held in the air by rotors rotating on a vertical axis and driven by power directly supplied to the lifting surfaces.

Further it is known that due to physical and aeronautical considerations the conventional blades of an autogiro's and helicopter's rotor produce a greater lifting momentum when the vehicle is on the ground than when it is in flight. Ordinarily when the helicopter is made ready for take-off, the helicopter's engines are kept idling with the craft's blades leisurely rotating around supplying no perceptible lift. But when the helicopter is ready to rise, the engines are speeded up to produce the needed lifting force. Notwithstanding this fact, the craft usually lags behind in leaving the ground immediately after the application of the maximum lifting momentum by the helicopter's lifting blade-rotors. This lag in rising is mostly due to the fact that the weight of the craft has to be accelerated from its resting position upon the ground to its vertical flying speed. Under these conditions a thrust directed upwardly in addition to the thrust already produced by the helicopter's conventional blade-rotors can be of great advantage. This is one instance in which a thrust augmenter or a booster can find application. Such a booster may be operated by an internal combustion engine or by rocket motors. While it is not necessary for such a booster to be in operation indefinitely and not for more than one or two minutes at a time at the most, the additional lift produced by its blade-rotor can appreciably add to the lifting efficiency of a helicopter.

A further application for the type of thrust augmenter or booster herein described can be found in military helicopters. While at present military helicopters are mainly used to evacuate wounded personnel and for rescue work, their application to tactical warfare is limited. One disadvantage of present day helicopters is the fact that they are slow, cumbersome and are lacking in maneuverability under enemy fire. Therefore they are extremely vulnerable to attack. By supplying the helicopters with a lift augmenter or booster their safety may be increased manyfold and their use for tactical military maneuvers will become feasible. With a thrust augmenter means the military helicopters will be able with sudden bursts of lifting momentum to dash up and away from the line of fire of enemy aircraft.

Moreover when the craft is in the air, by simply rotating the variable pitch blades of the vertical thrust augmenter 180 degrees around from their lift producing position and without reversing the direction of rotation of its rotor, the booster will produce instead of a lift a downward momentum to increase the vehicle's landing speed if necessary.

The aerial thrust augmenter of the present invention may be used in connection with conventional helicopters or autogiros that are of standard design and of advanced design. In conventional helicopters the thrust augmenter may be mounted upon a turret in a convenient location upon the helicopter's fuselage, and preferably close to its center of gravity. In either case, whether there is used a conventional helicopter or one of advanced design, the lift augmenter may be mounted independently from the conventional lift generating blades of the rotor assembly of the craft (although in some designs it may be necessary to mount it directly to the blades of the helicopter or to its rotor armature).

In general, the vertical lift augmenter herein described consists of a rotor armature that is provided with a plurality of variable pitch blades (propeller blades) which are similar in nature to the blades being used in aeroplanes (they may be also specially designed for the purpose). The armature upon which the blades are held is mounted upon the helicopter's fuselage and it is free to rotate upon a stationary shaft support that is being held perpendicularly upon a turret or a pylon. The blades of the vertical thrust augmenter are in this particular instance not driven by the prime mover of the vehicle itself (the engine that drives the helicopter's lift rotor) but is instead driven separately by means of a battery of reaction motors (rocket motors). The rocket motors in question may be mounted as a unit upon the armature of the vertical thrust augmenter itself and are being powered by the reaction force produced through the combustion of such liquid propellants as gasoline, heavy oil or alcohol mixed with liquid oxygen. In connection with the above, also ram-jet engines may be used to operate the vertical thrust augmenter in place of the above described rocket motors.

The rotation of the blades of a conventional helicopter rotor produce a torsion momentum that is directed in one direction and which must be counterbalanced and equalized by an equal torsion momentum directed in the opposite direction from the one of the rotation of the blades. This is necessary to balance the craft and to prevent its fuselage from swinging around in a circle. To that effect conventional helicopters (the ones that are being powered by a single rotor) are generally equipped with a torsion eliminating or equalizing propeller-driven mechanism; mounted in the tail end of the craft's fuselage. The rotation of the propeller of this torsion eliminating device will produce a force which will operate in the opposite direction to the force which tends to turn the fuselage of the craft around. Where two blade-rotors are being utilized (twin engine), usually one of the rotor armatures is being driven in one direction while the other in the opposite direction to counterbalance each other torsion momentum. But no such problem is met with such a vertical thrust augmenter as herein described; its blade-rotor being driven by reaction forces generated by rocket motors in place of a prime mover mounted inside the helicopter's fuselage. The complete elimination of the torsion momentum is mainly due here to the fact that the booster's blade-rotor are being rotated not by the operating shaft of the prime mover of the craft but by a prime mover that is located exterior to it. The shaft upon which the entire rotor armature of the booster rotates merely serves as a support and not as an operating shaft.

Inasmuch as a helicopter thrust augmenter or booster is not depending upon its operation on the prime mover of the vehicle, it is not developing a torsion momentum which must be overcome and equalized. Because of this fact a single blade-rotor assembly is sufficient unless an extra assembly is needed to produce an additional booster thrust. It is understood that the blade-rotor of the thrust augmenter can be made to turn clockwise or counter-clockwise (depending upon the direction in which the reaction force of its rocket motors is generated, or depending upon the position or direction in which the rocket motors are mounted upon the armature and upon the direction that the motors face with their exhaust nozzles).

From the foregoing description it is clear that the lift momentum of a conventional helicopter can be considerably increased by a vertical thrust augmenter; the latter supplying an additional force or lift added to the one already being produced by the helicopter's conventional blades or vanes. This additional thrust will increase the rate of the helicopter's climb and vertical acceleration at take-off and will greatly improve its maneuverability in flight. Conversely, when a helicopter is already in the air and when it is necessary for it to rise at a faster rate of speed than its blade-rotors can produce, the thrust augmenter herein described may be used with telling effect. This is especially true in military helicopters where speed and maneuverability is of the utmost importance to help it dodge bullets and cannon shells from pursuing enemy aircraft.

The reaction motor means driving the thrust augmenter in question might include a number of liquid propelled rocket motors, or ram-jet engines. In either case, whether there are rocket motors or ram-jet engines being used these might be mounted close to the center of the rotor's armature or a distance away from it. Also they may be mounted at the extreme outer edge of the rotor's blade. In either case, appropriate piping connections are needed to pipe the liquid propellants to the motors (the fuel propellants in question may be high octane gasoline, heavy oil, alcohol etc., while the fuel oxidizer may be liquid oxygen, in the case of rocket motors and atmospheric air in the case of ram-jet engines). To overcome the centrifugal force produced by the rotating rotor armature of the trust augmenter, the rocket motors are mounted upon the armature tangentially in relation to the radius of rotation and slightly inclined towards the center of rotation. The position in which the motors are mounted will produce a force component that will react against the centrifugal force produced by the rotating rotor armature. This equalizing force will in turn keep centrifugal forces in check and will make possible the utilization of larger and heavier rotor assemblies with safety. Larger rotor assemblies carrying more rocket motors will in turn produce more lifting momentum without endangering the safety of the craft and its crew. It is understood that the proportion of lifting momentum that is being produced by the booster must be much greater than the dead weight of the booster mechanism itself. Accordingly while the thrust of bigger augmenters must increase their dead weight must proportionately decrease. If the booster mechanism is too heavy then not much of its thrust can be utilized for booster purposes. This problem can be readily solved by the use of light materials and by proper overall design.

While the blade-rotor of the thrust augmenter may be driven by means of conventional liquid fuel rocket motors (their design and mode of operation being well known to the art) it is preferable to rotate the rotor armature by means of a variable thrust rocket motor. This type motor has been fully described in the patent application Serial Number 262,514, filed December 20, 1951, for—High Altitude Rockets and Motor Means Therefore for Thrust and Acceleration Regulation, applicant — Constantin Paul Lent. Inasmuch as a variable thrust rocket permits a wider range of charge changes, it can be readily utilized in the booster mechanism herein described and its use will immeasurably improve their operation. For instance, the thrust augmenter can be made to go faster or slower by simply regulating the thrust of the variable thrust motors. The thrust of such motors can be regulated by remote control from the navigator's cabin in the helicopter.

An object of this invention is therefore to provide a thrust augmenter for autogiros and helicopters that will produce a booster of a lifting force in addition to the lifting force generated by its conventional rotor blades. Such a thrust augmenter to be of simple design and safe and easy to operate.

Another object of this invention is to provide a thrust augmenter for autogiros or for helicopters that is reaction driven and may find utilization as a prime mover as well as a thrust augmenter.

A still further object of this invention is to provide a thrust augmenter for helicopters that is reaction driven and is operating independently from the prime mover of the craft.

A further object of this invention is to provide a reaction driven blade-rotor to produce a booster thrust to facilitate the take-off. Said booster also to produce a secondary thrust operating in the opposite direction from its centrifugal momentum.

Further objects will be seen as the description of this specification will proceed.

Referring to figures.

Specifications

Figures 1, 2, 3, 22A:
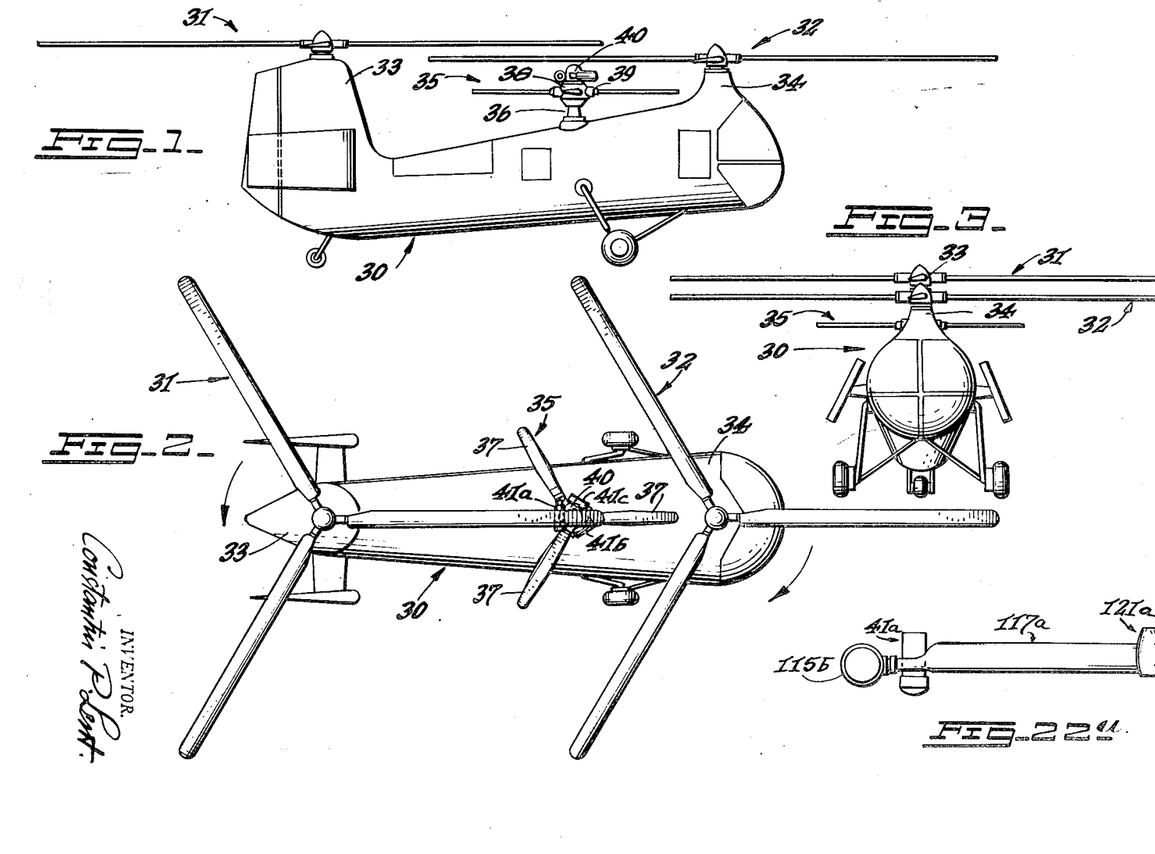
Fig. 1 shows a side elevation of the fuselage of a conventional helicopter. The helicopter is equipped with a pair of blade-rotors to produce a vertical lift. In addition it is provided with a separate blade-rotor assembly to serve as a vertical thrust augmenter to produce a booster lift.
Fig. 2 is a top elevation of the helicopter shown in Fig. 1. This view shows the relative position of the blade-rotor vertical thrust augmenter in relation to the two blade-rotors of a conventional helicopter.
Fig. 3 is a front elevational view of the helicopter shown in Fig. 1.
Fig. 22a is a modification showing the application of a rocket motor and a ram-jet engine in connection with a blade-rotor.

Referring to Fig. 1, numeral 30 indicates the fuselage of a conventional helicopter being equipped with a pair of blade-rotor armatures 31 and 32. The armature 31 is rotatably mounted upon the fuselage of the helicopter 30, at 33 and right above its tail portion, while the blade-rotor 32 is rotatably mounted upon the turret-shaped protrusion or pylon 34. The latter extends upwardly and beyond the forward portion or the head of the fuselage. Both rotor armatures 31 and 32 are being operated in unison by means of a reciprocating engine which is mounted within the fuselage of the helicopter (not shown). The armatures 31 and 32 are being rotated counterclockwise to each other motion to compensate or to equalize the torsion momentum developed as a result of their rotation. To launch the helicopter into the air both blade-rotors are rotated at once. Finally the lifting thrust developed by the rotors overcomes the static weight (dead weight) of the helicopter's fuselage and makes it rise and lift itself vertically off the ground. The faster the blade-rotors rotate the greater is the acceleration of the rising craft until its final lifting torsion momentum is reached and the vehicle has completely cleared the ground.

With further reference to Figs. 1, 2 and 3 it can be seen that the helicopter's fuselage is further equipped with a third rotor 35. The latter is mounted separately upon a turret-shaped support 36. The support 36 is formed by the upper portion of the craft's fuselage and is preferably located close to its center of gravity. The rotor 35 is not driven by the prime-mover operating the rotors 31 and 32 but separately; its function being to serve as a thrust augmenter or booster.

More particularly referring to the thrust augmentor 35 primarily it consists of a plurality of blades 37 (there are three blades shown but there may be used more than three, four or even five). The blades 37 are being held upon the rotor's armature 38 in bearing sockets 39 in which they are free to rotate around their axis when it is necessary to change or to alter their flying pitch. To operate the booster, right above and over the rotor armature 35 there is a secondary armature 40 that serves as a mounting support or a base to a plurality of reaction driven engines or rocket motors 41a, 41b and 41c to supply the force or the kinetic energy to operate the booster and thrust augmenter 37 (there are in this case three rocket motors shown but a greater number may be used such as four or five).

Figure 4:
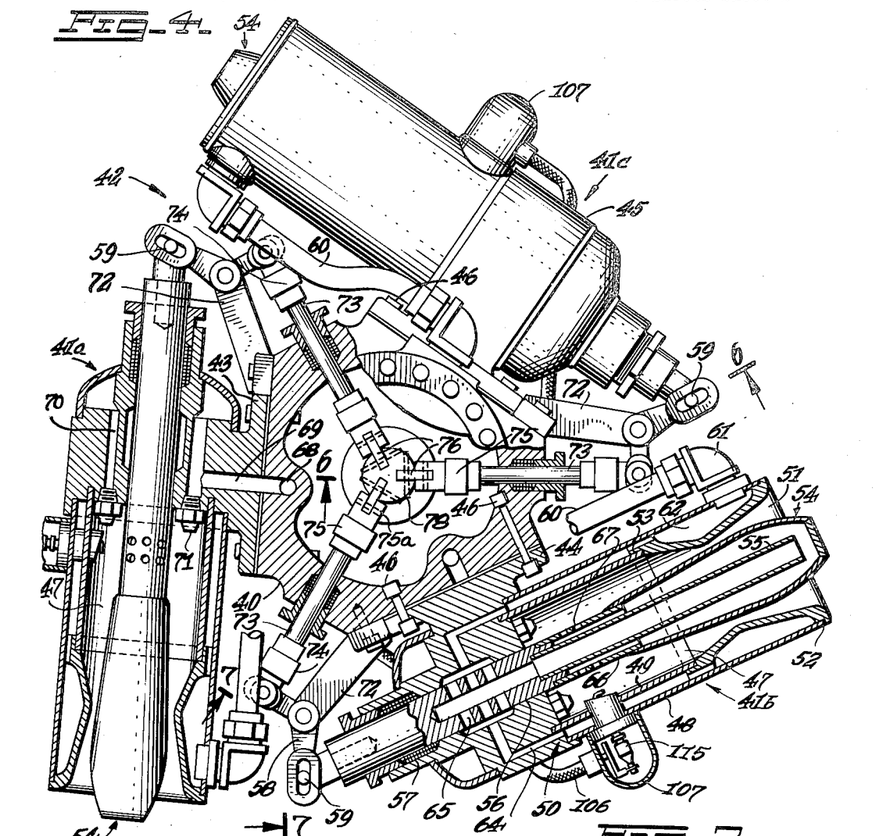
Fig. 4 is a partial cross-section through the blade-rotor assembly of the vertical thrust augmenter showing the reaction motor means that is being utilized to rotate the blade-rotor of the vertical thrust augmenter. In addition it shows other details of the vertical thrust augmenter mechanism.

Figs. 4 to 10 inclusive show further details of the thrust augmenter. Referring to Fig. 4, showing a plan section through the rotor itself, numeral 42 indicates the body of the rotor including the rotor armature 40 with its three rocket motors 41a, 41b and 41c; the latter being secured to the former by means of the frame members 43, 44 and 45 and the fastening screws 46.

The combustion chamber 47 of each of the rocket motors consists of an outer shell 48 and an inner lining 49. Both shells being welded to the frame member 45 at 50. The opposite ends of the shell 48 and lining 49 are welded to the exhaust nozzle 51, at 52 and the inner shell at 53 while an adjustable inner core 54, with a centrally located pipe member 55 passing through the center portion 56 of the frame 45. The core 54 extends through and beyond the stuffing box 57 and is secured to the swiveling arm 58, at 59.

The propellant fuel enters the combustion chamber 47 by way of the connecting piping 60, the elbow bend 61, the passage 62, the opening 64, the holes 65 in the core 54 and hence, through the piping 55 and the space 66 into the combustion chamber 47, entering it by way of the fuel ports 67. The liquid oxygen on the other hand enters the combustion chamber 47 through the connecting holes 68 in the frame 40, the holes 69 in the frame 45, and hence through the openings 70 in the frame 40 and the atomizer nozzles 71 into the combustion chamber 47. For more information regarding the operation of the adjustable thrust rocket motors herein described see application Serial Number 262,514.

Figures 6, 7:
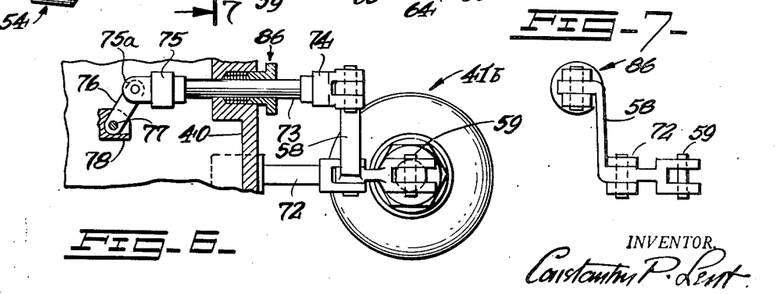
Fig. 6 is a side section taken on the line 6—6 of Fig. 4, showing the link mechanism that operates the adjustable core in the variable thrust rocket motor means in the vertical thrust augmenter.
Fig. 7 is a view taken on the line 7—7 of Fig. 4, showing in detail the arms and links of the mechanism operating the variable thrust rocket motor means.

The adjustable cores 54 in the rocket motors are being operated by means of the swivel arms 58 swiveling upon the supports 72. A plunger 73 being provided with a pivot bearing 74 on one end and with another pivot bearing on the other end thereof numbered 75 is also provided. Further a link 76 is secured to the pivot 75 at 75a with its other end being secured to the support 78 at 77. In addition the support 78 is secured to the upright 79 that serves as the supply pipe for the propellant fuel. The plunger arm 73 extends outwardly and beyond the frame 40 passing towards the outside through the stuffing box 86 in the frame member 40.

Figure 5:
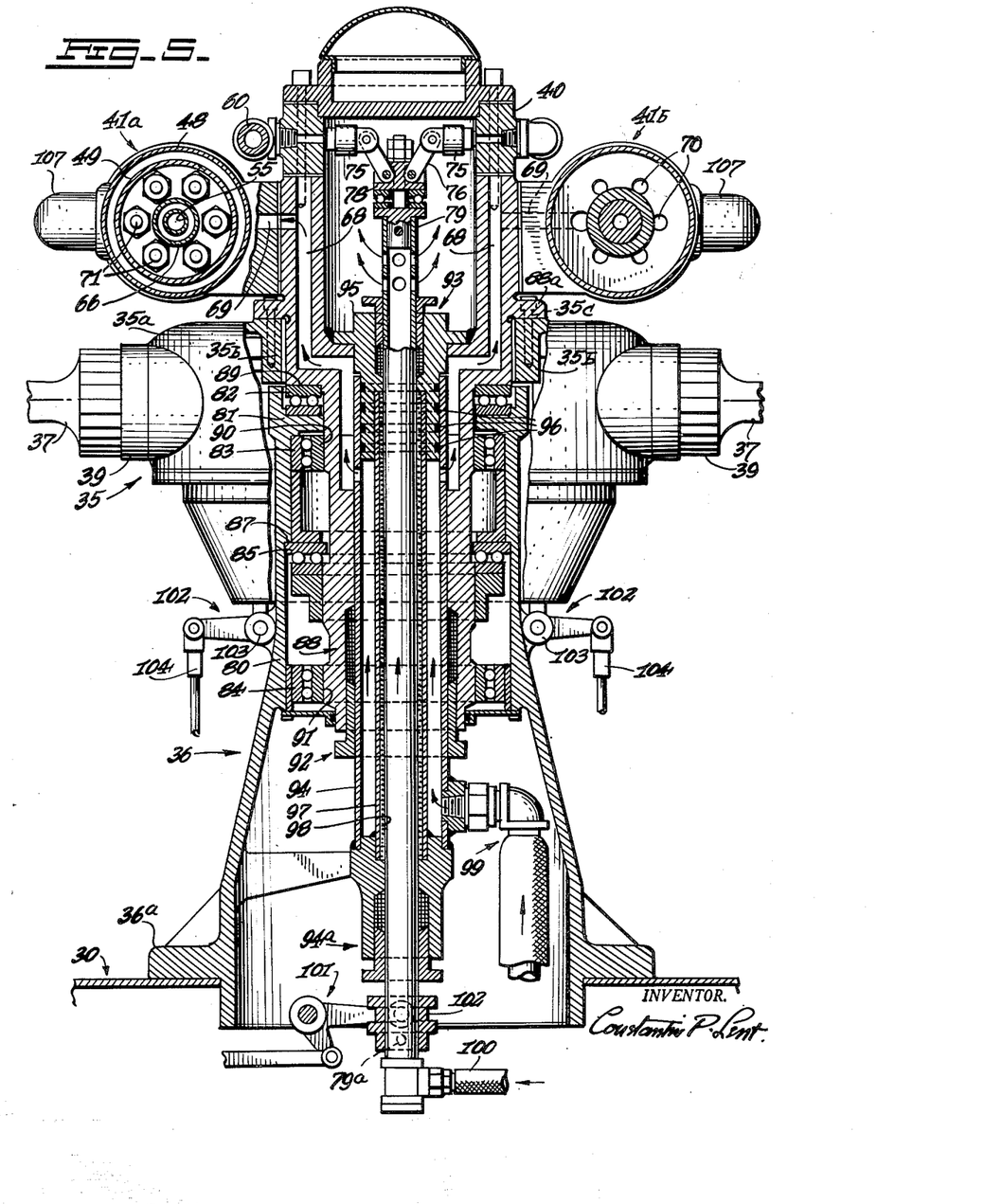
Fig. 5 is a vertical cross-section through the vertical thrust augmenter blade-rotor assembly shown in Figs. 1 to 4 inclusive, and the reaction motor means to drive the vertical thrust augmenter. This view also shows the turret upon which the rotor turns and the manner in which the propellant fuels are being delivered to the reaction motors driving the thrust augmenter.

Referring to Fig. 5, the turret 36 consists of a hollow upright support 80 having a shoulder 81 which supports a thrust bearing 82. Another axial bearing 83 and a third bearing 82 are held inside the turret 80, while a secondary thrust bearing 85 is located under the ridge 87 of the turret frame. The rotor hub 88 has a flange 89 that is fitted upon the thrust bearing 82 being axially supported at 90 and 91 by the axial bearing 83 and 84 respectively.

The rotor member 88 is hollow and has at its lower portion a stuffing box 92 and a secondary stuffing box 93 which is located at the upper portion thereof. In addition, a oversized pipe member is fitted into the stuffing box to facilitate the supply of the liquid oxygen to the rocket motors upon the rotor's armature. The fuel supply pipe is fitted within the liquid fuel pipe 94 and a stuffing box 93 serves to produce a leakproof fit between the fuel supply pipe 79 and the liquid fuel pipe 94.

To produce a leakproof fit for the liquid fuel pipe 94, a rotary sleave 95 is provided with a number of cylinder rings 96 and it is snugly fitted inside the pipe 94. In addition, the rotary sleave 95 supports a plastic elongated sleave or pipe 98 which serves to insulate the fuel supply pipe 79 from the low temperature contained inside the liquid oxygen pipe 94. Both pipes 79 and 94 are stationary in respect to the rotor of the armature which rotates, but the fuel delivery pipe 79 can be moved vertically. Further the pipe 94 is connected to an oxygen supply connection 99 with the fuel supply pipe 79 being connected to a fuel supply connection 100. The pipe 79 is moved vertically up and down by the link arm 101 and the coupling 102, the latter being fastened to the lower end of the pipe 79 at 79a. It can be seen that the fuel supply pipe passes through the stuffing box 94a located in the lower end of the oxygen supply pipe 94.

The variable pitch blades 37 of the rotor 35 are supported in the frame 35a of the blade-rotor armature. The blades 37 are moveably mounted in the bearing studs 39. The variable pitch propellers utilized in the present invention may be of any conventional design and require no description. The rotor casting 35a is being held by the flange 35b and the screws 35c to flange 88a that is located upon the rotor 88. To vary the pitch of the blades 37, the link arms 102 are operated; the latter are pivotably held at 103. The links 102 are moved by means of the push rods 104 that are operated by remote control from the helicopter's control cabin. The turret 39 is supported upon the fuselage 30 of the helicopter by means of a flange member 36a.

Figures 8, 9, 10, 15:
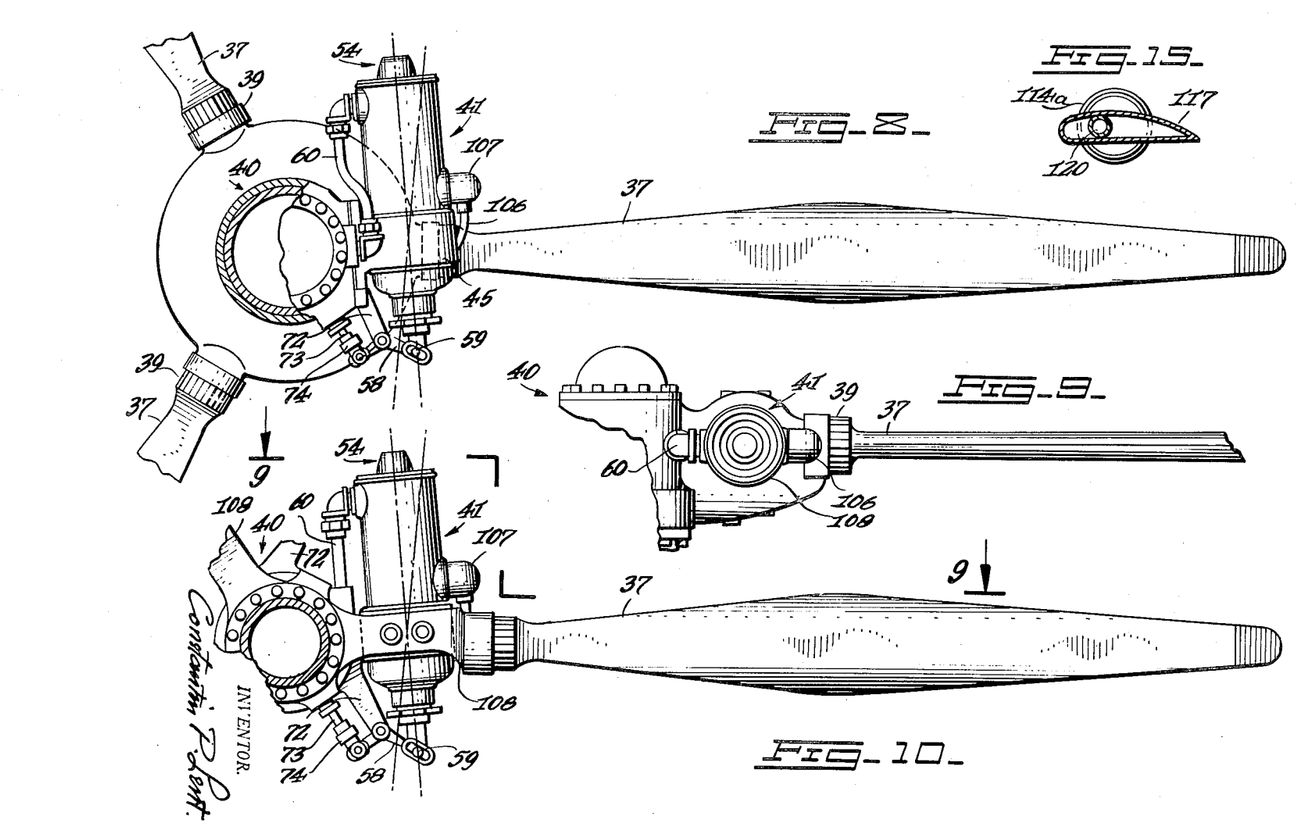
Fig. 8 is a view showing the construction of a single rotor-blade of the vertical thrust augmenter and the manner in which the rocket motor means for driving the thrust augmenter is mounted upon the rotor armature.
Fig. 9 is a side view of the rotor-blade assembly being shown in Fig. 10, taken on the line 9—9 of Fig. 10.
Fig. 10 is showing the manner in which the reaction motor means might be secured to the rotor armature of the blade-rotor of the vertical thrust augmenter.
Fig. 15 is a section taken on the line 15—15 showing the manner in which the propellant feed pipe of the ram-jet engine is mounted inside the blade of the rotor of the vertical thrust augmenter.

Fig. 8 is a plan view of one of the lifting blades of the rotor 36 showing the manner in which the rocket motors may be secured to the rotor. Fig. 10 is a view similar to Fig. 8 showing the rocket motors 41 fitted through an opening 108 that is provided inside the rotor armature instead of being held right above it, and Fig. 9 is a side view of the blade and rotor assembly taken on the line 9—9 of Fig. 10.

Figures 11, 16:
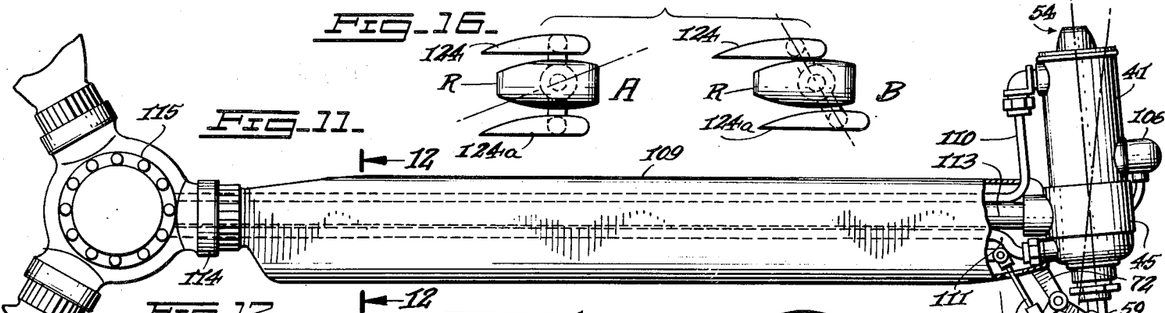
Fig. 11 is a modification of the rotor-blade assembly being shown in Figs. 1 to 10 inclusive. In this case the rocket motor means in question is being shown mounted upon the outer tip of the rotor-blade instead of to the armature of the blade rotor of the vertical thrust augmenter.
Fig. 16 is showing how a ram-jet engine can be applied to a pair of rotor blades which are arranged above and below the ram-jet motor.

Referring to Fig. 11 showing a modification of the rocket motor driven blade-rotor armature, the motor 61 is in this latter case secured to the outer edge of the blade 109 instead of near its hub. In this design the fuel supply pipe 110 and the liquid oxygen supply pipe 111 run right through the wing or blade fuselage 109, while the rotor is supported upon the support 113, the latter leading through the hub 114 of the rotor 115.

Figures 12, 13, 14, 17:
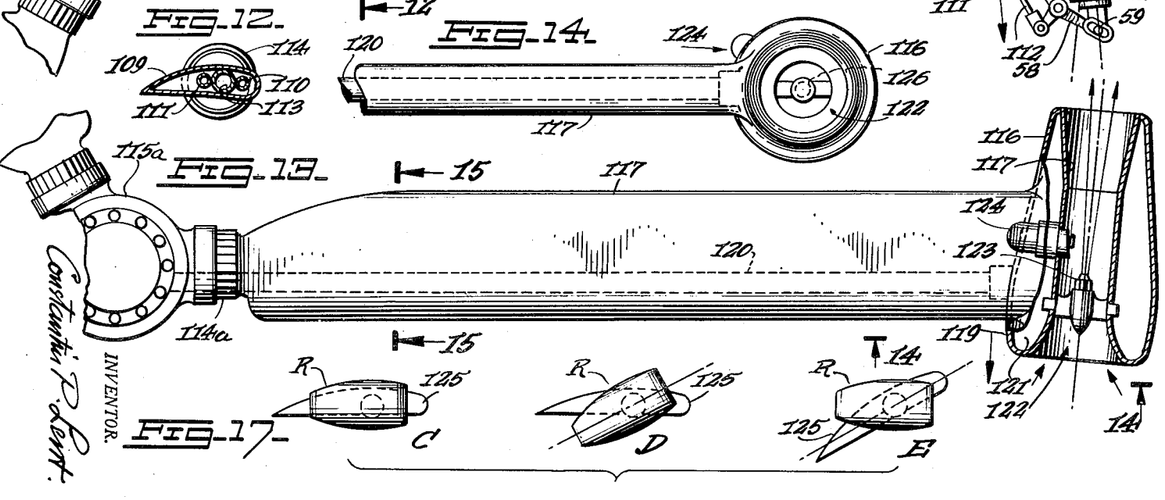
Fig. 12 is a section taken on the line 12—12 through the rotor-blade in Fig. 11, showing the manner in which the propellant fuels are being delivered to the vertical thrust augmenter.
Fig. 13 is a further modification showing the application of the athodid or ram-jet motor principle in connection with the rotor-blade assembly shown in Figs. 1 to 12 inclusive.
Fig. 14 is a side view taken on the line 14—14 of Fig. 13 showing the ram-jet motor being secured to the tip of a rotor-blade.
Fig. 17 is showing the manner in which a ram-jet engine may be secured to the tip of a rotor blade and its various positions.
Figures 18, 19, 20, 21:
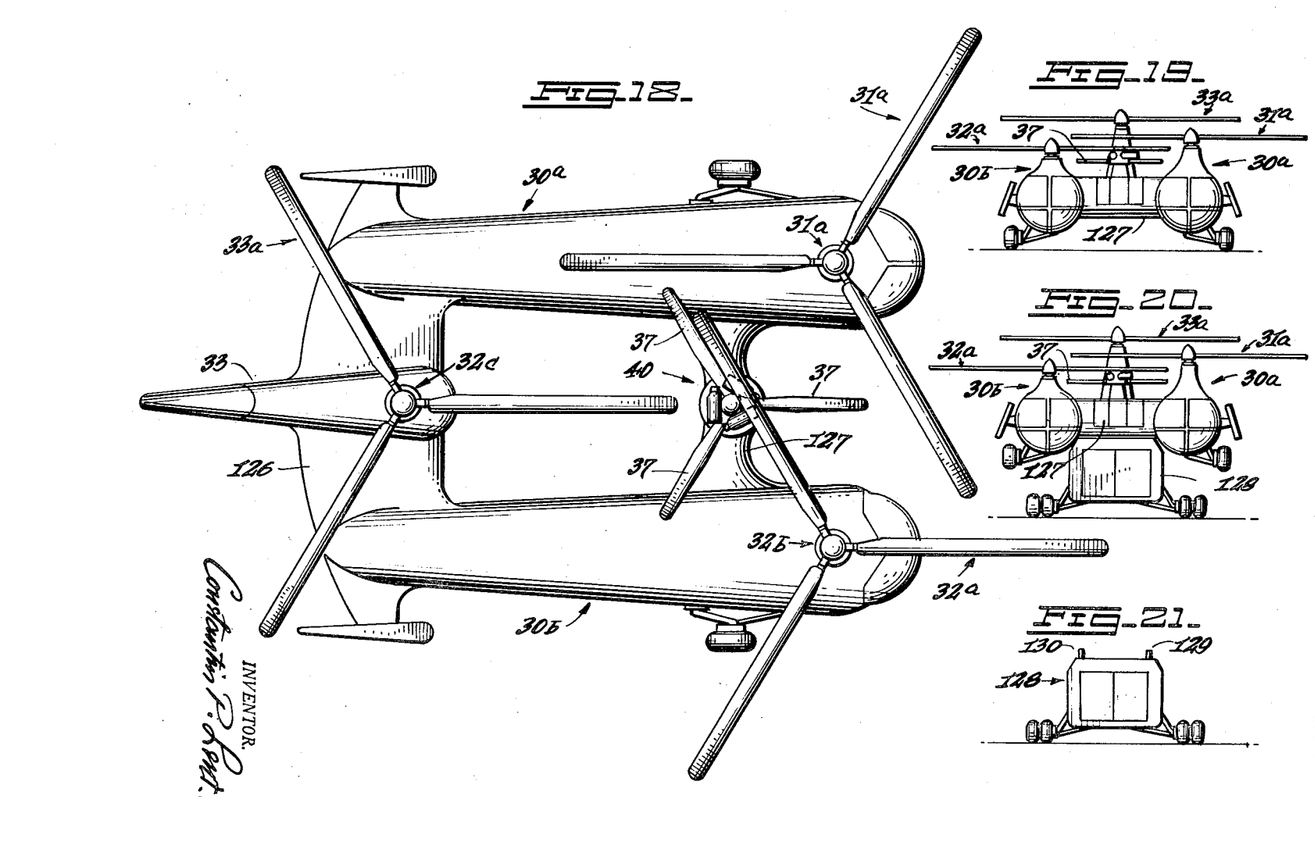
Fig. 18 is a modification of the helicopter craft shown in Figs. 1 to 3 inclusive showing the application of three lift rotor assemblies and a vertical thrust augmenter means.
Fig. 19 is a front view of the helicopter shown in Fig. 18.
Fig. 20 shows the application of the helicopter craft shown in Fig. 19 in connection with a cargo carrier suspended under its fuselage.
Fig. 21 is a detail view showing the cargo carrier of Fig. 20.

Fig. 13 is a further modification showing a ram-jet engine 116 that is attached to the outer edge of the rotor blade 117. The ram-jet engine in question consists of an inner shell 118 and an outer lining 119. The propellant fuels are fed to the engine by way of the spray nozzle 123 and the atmospheric air to burn the fuel enters the motor through the opening 122. The mixture of fuel and air is ignited by means of a spark-plug (not shown). The fuel supply pipe 120 enters the blade passing through the sleave 114a in the rotor's hub 115a.

Fig. 16 and Fig. 17 show various applications of a ram-jet engine in combination with a rotor blade. Fig. 16 shows at A a ram-jet engine in combination with a pair of blades located one above the other while at B the blades are shown off-set from each other to produce a greater lift. Fig. 17 shows at C the ram-jet engine R mounted parallel with the rotor blade 125, at D the ram-jet engine is shown turn pointing upwardly with the rotor blade horizontal, while at E the ram-jet engine is mounted in a horizontal position with the rotor blade facing upwardly. Various other ways of mounting may be used besides the ones shown in Figs. 16 and 17.

Figure 23:
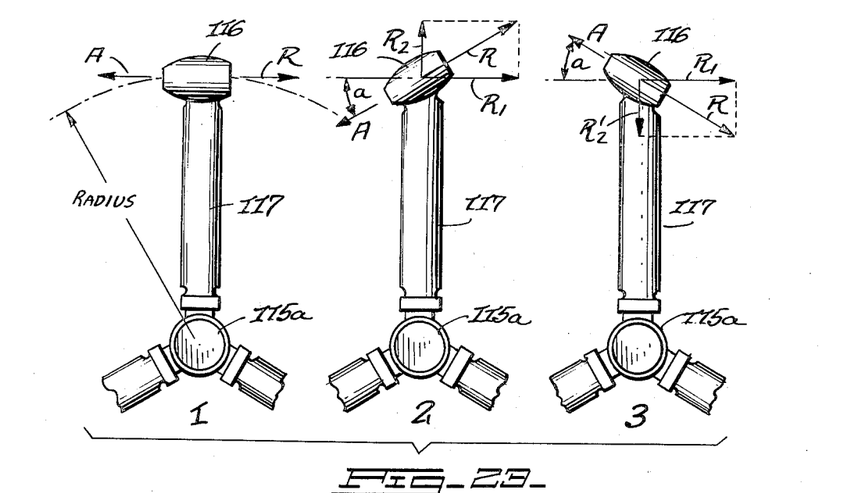
Fig. 23 shows diagrammatically various positions of a ram-jet mounted upon the outer tip of an aerial blade and the manner in which the reaction force produced by the ram-jet brakes into two separate component forces because of the inclined mounting.

Fig. 23 shows diagrammatically three positions of a ram-jet engine secured to a rotor blade. At (1) the ram-jet 116 is secured to the blade 117 tangentially to the radius of rotation. In this case the reaction force produced by the ram-jet is equal to the action produced by the combustion fuels. Here R is equal to A. At (2) the ram-jet 116 is inclined with its nozzle facing downwardly to the left. The inclination angle is $a$. In this case the action force A produces a reaction force R, but here the R because of the upward position of the ram-jet 116 brakes into two separate forces, the force $R_1$ which acts tangentially to the direction of rotation, and a secondary force $R_2$ which acts away from the center of rotation. In this case the force $R_2$ adds its power to the centrifugal force created by the rotating armature or hub 115a. At (3) the ram-jet 116 is mounted to the blade 117 by the angle $a$ inclined towards the hub 115a with the action force A facing away and the reaction force R facing towards the center of rotation. In this case the reaction force R because of the inclination of the ram-jet 116 is broken into two components, the force $R_1$ which like the same force at (2) works tangentially to the radius of rotation, and the force $R_2'$ which works in opposition to the centrifugal force. In the case of (3) the opposing force $R_2'$ reduces the centrifugal force. The greater the inclination angle $a$ the greater is the reduction of the centrifugal force. If the angle becomes 90 degrees, then the entire R works in opposition to the centrifugal force generated by the rotating armature and the blade rotor stops rotating. Because of this, the angle of inclination $a$ must not be too large, just large enough to produce a secondary force $R_2'$ to counterbalance the centrifugal force.

Figures 22, 24:
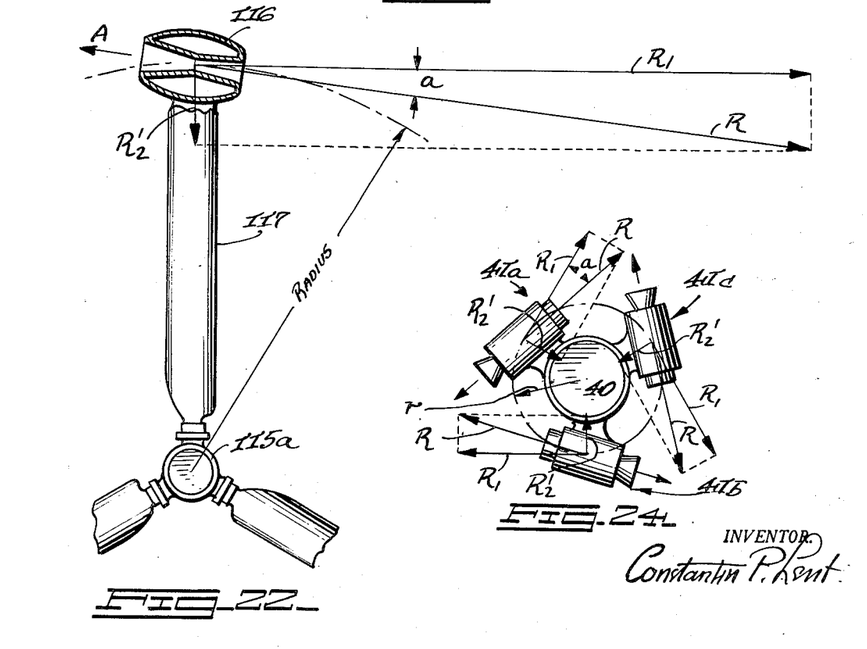
Fig. 22 shows diagrammatically the various forces of reaction produced by the inclined position of a ram-jet mounted to the outer tip of an aerial blade.
Fig. 24 shows the manner of mounting for three rocket motors to produce the resultant secondary forces shown in position 3 of Fig. 23.

Fig. 24 shows diagrammatically three rocket motors 41a, 41b and 41c respectively, showing all three rocket motors being inclined by the angle $a$ towards the radius of rotation $r$ (the nozzles of the motors facing away from the rotor 40 by the angle $a$). In this case, like in Fig. 23, the reaction force R is broken into the secondary forces $R_1$ and $R_2'$, the latter working in opposition to the centrifugal force generated by the rotating armature 40.

Having described my invention what I claim is:

1. In an aerial vehicle including a rotating armature, blades mounted in said armature, said armature mounted upon an upright support, prime mover means for rotating said armature, said prime mover means including a number of rocket engines comprising a combustion chamber and an exhaust nozzle, said engines secured to the outer tips of said blades, propellants delivery means leading to the combustion chamber and means to ignite said propellants in said combustion chamber to produce a reaction force to rotate said blades and said armature respectively; and means to vary the thrust of said rocket engines including a centrally movable core in each of said engines, said core adjustably mounted and movable within said exhaust nozzle of each of said engines, and means to move said core longitudinally within said nozzle.

2. In an aerial vehicle including a rotating armature, said armature mounted upon a pylon, aerial blades held to said armature and extending radially away from said armature, prime mover means to rotate said armature including a number of rocket engines comprising a combustion chamber and an exhaust nozzle, one engine secured to the outer tip of each blade in a position inclined towards the center of rotation of said armature; propellants delivery means leading to the combustion chamber of each of said engines and spark means to ignite said propellants; and means to vary the thrust of said engines including a centrally positioned core in each of said engines adjustably movable within said exhaust nozzle of each of said engines, and means to move said cores longitudinally within each of said nozzles.

3. In a combination of propeller means with reaction motor means including a rotating armature, said propeller means including a group of propeller blades mounted and extending radially from said armature, said reaction motor means including a number of rocket motors comprising a combustion chamber and an exhaust nozzle mounted directly upon said armature and circumferentially thereto, said armature being rotatably mounted upon a pylon secured to the fuselage of a flying vehicle; hub means for mounting said propeller blades, and bracket means for mounting said rocket motors; piping means leading to said rotor to supply propellants fuels to the combustion chamber of each of said rocket motors, and spark ignition means to ignite said propellants fuels; means to vary the thrust produced by each of said motors, said means including a centrally mounted core in each of the exhaust nozzles of said rocket motors, said cores adjustably movable in the exhaust nozzles of each of said rocket motors, and means to move each of said cores longitudinally in said nozzles.

4. In a combination of propeller means with reaction motor means including a rotating armature, said propeller means including a group of aerial blades mounted to said armature, said reaction motor means including a number of rocket motors comprising a combustion chamber and an exhaust nozzle secured to said armature, hub means for mounting said aerial blades to said armature and bracket means for mounting said rocket motors, said rocket motors being held upon said armature in an inclined position relative to the center of rotation, said armature being mounted upon a pylon secured to the fuselage of a flying vehicle and being made to rotate by said rocket motors; piping means to supply propellant fuels to the combustion chamber of each of said motors and spark ignition means to ignite said propellant fuels; and core means within the exhaust nozzles of each of said motors to vary the thrust of said rocket motors and the lift of said aerial blades respectively.

References Cited in the file of this patent

UNITED STATES PATENTS

| | | |
|---|---|---|
| 1,277,206 | Fedchenko | Aug. 27, 1918 |
| 2,385,464 | Peterson | Sept. 25, 1945 |
| 2,509,359 | Margolis | May 30, 1950 |
| 2,514,749 | Dobbins | July 11, 1950 |
| 2,601,463 | Stanley | June 24, 1952 |
| 2,605,608 | Barclay | Aug. 5, 1952 |
| 2,667,226 | Doblhoff | Jan. 26, 1954 |

FOREIGN PATENTS

| | | |
|---|---|---|
| 612,189 | Great Britain | Nov. 9, 1948 |
| 614,624 | Great Britain | Dec. 17, 1948 |
| 809,963 | France | Mar. 12, 1937 |
| 934,803 | France | June 2, 1948 |